(No Model.) 2 Sheets—Sheet 1.
L. A. ASPINWALL.
FERTILIZER ATTACHMENT FOR PLANTING MACHINES.
No. 529,099. Patented Nov. 13, 1894.
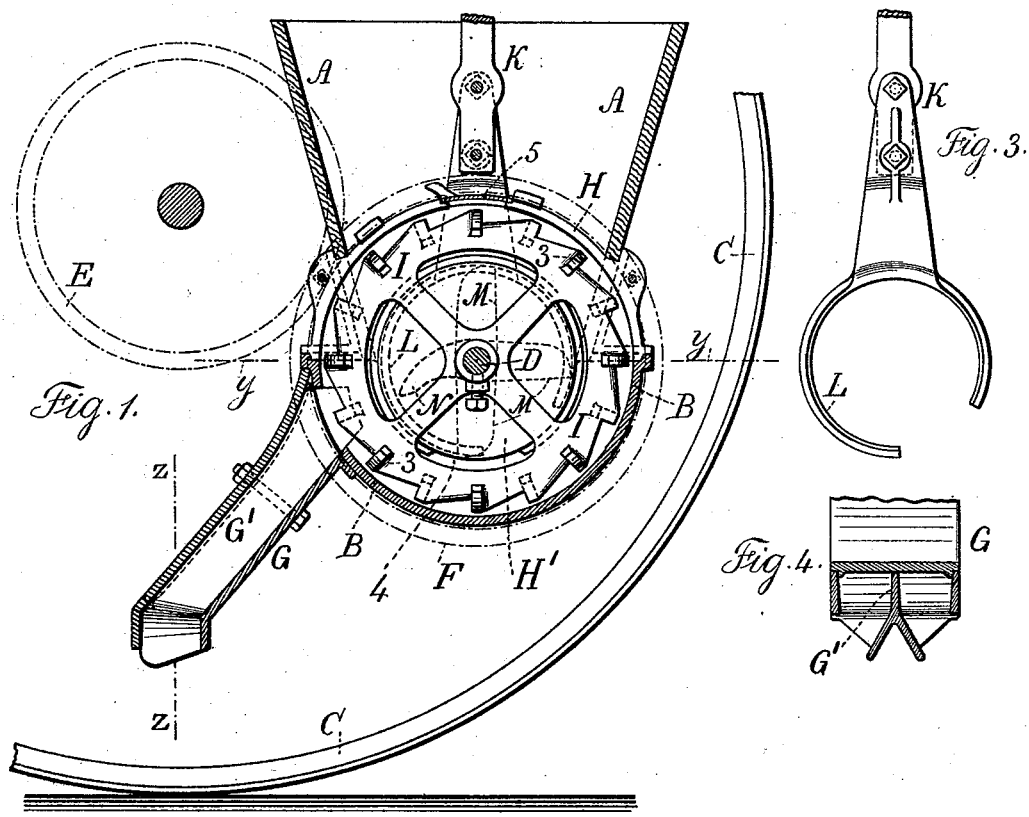

(No Model.) 2 Sheets—Sheet 2.
L. A. ASPINWALL.
FERTILIZER ATTACHMENT FOR PLANTING MACHINES.

No. 529,099. Patented Nov. 13, 1894.

Witnesses:
J. Staib
Geo. T. Pinckney

Inventor:
L. A. Aspinwall
per Lemuel W. Serrell
Atty.

UNITED STATES PATENT OFFICE.

LEWIS AUGS. ASPINWALL, OF JACKSON, MICHIGAN, ASSIGNOR TO THE ASPINWALL MANUFACTURING COMPANY, OF SAME PLACE

FERTILIZER ATTACHMENT FOR PLANTING-MACHINES.

SPECIFICATION forming part of Letters Patent No. 529,099, dated November 13, 1894.

Application filed June 14, 1894. Serial No. 514,491. (No model.)

*To all whom it may concern:*

Be it known that I, LEWIS AUGUSTUS ASPINWALL, a citizen of the United States, residing at Jackson, in the county of Jackson and State of Michigan, have invented an Improvement in Fertilizer-Distributers for Planting-Machines, of which the following is a specification.

This fertilizer distributer is intended especially for supplying fertilizing material in connection with the planting of corn, but it may be used with any other planting machine, the object being to deposit the pulverulent fertilizing material closely adjacent but not directly upon the seeds that are planted.

In carrying out this invention I make use of a feed wheel which is rotated and provided with paddles that carry up the fertilizing material within a shell and discharge the same into a spout, and the spout is provided with a partition and a spreader at the lower end, and the buckets upon the feed wheel are arranged with reference to the partition in the spout so as to discharge the material first at one side and then the other, and upon the revolving shaft that carries the feed wheel there are paddles with inclined cutting edges that stir up the fertilizing material within the hopper and pulverize the same and at the same time feed the pulverulent material toward the feed opening in the shell, and there is a regulating device for covering the feed opening more or less and determining the amount of fertilizer supplied to the feed wheel.

Figure 5:
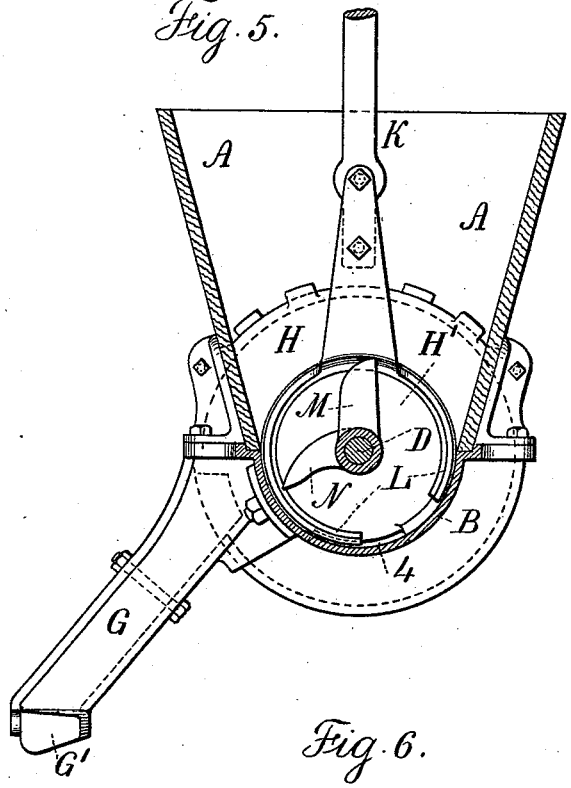
Figure 6:
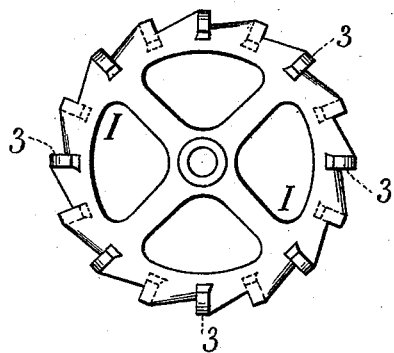

In the drawings, Figure 1 is a vertical section at the line *x x* of Fig. 2. Fig. 2 is a sectional plan at the line *y y* of Fig. 1. Fig. 3 represents the regulating device separately at one side of the shell, and Fig. 4 is a section at *z z*, Fig. 1. Fig. 5 is an elevation of the case for the wheel and section of the hopper base, and Fig. 6 is a side view of the wheel detached.

The hopper A is supported in any suitable manner and it is of a size adapted to receive the fertilizing material, and the hopper base B is in the form of a nearly semi-circular trough which is advantageously connected with the framework, and at C I have represented one of the supporting wheels for the machine, and the shaft D that is supported by the hopper base B is driven by any suitable mechanism. Gear wheels are represented at E F for this object, and it is to be understood that this fertilizer distributer may be applied upon a corn planter, or a potato planter, a seed drill, or any other planting mechanism.

The spout G is at a suitable inclination and divided up by a central partition G', the lower end of which is V-shaped or diverging sufficiently to throw the pulverulent fertilizer in two lines adjacent to but not directly upon the seed that is planted, and the shell H is a circular extension from the upper end of the spout G, such shell H being nearly circular in cross section and having parallel or nearly parallel disk portions H' forming with the grooved bottom of the hopper base B a substantially annular space within which the feed wheel I is revolved by the shaft D. This feed wheel is made with a series of buckets 3 projecting first at one side and then at the other side, and the periphery of the feed wheel is notched and angular so as to act to the best advantage upon the pulverulent fertilizing material to carry a small portion of such material up the channel in the hopper base and deliver the same into the spout first at one side of the partition and then at the other, so that such material falls down through the spout and is delivered. This peculiar construction of feed wheel with the notched cutting edge and the buckets, prevents the feed wheel becoming clogged by the fertilizing material, and the shell H excludes the fertilizing material that is in the hopper except such as may pass in through the feed openings 4 at the sides of the shell. These feed openings are closely adjacent to the channel in the bottom of the hopper base, so that the fertilizing material runs directly through these feed openings into the channel of the hopper base to be acted upon by the buckets of the feed wheel, and the openings 4 are large enough for supplying the greatest quantity of fertilizer that may be required, and these openings can be diminished in size by the hand regulating device which consists of a lever K having a forked lower end and connected to the regulators L, which are nearly circular, there being an opening between the lower ends of each regulator, the ends of the regulator being adjacent to the ends of the feed openings, so that by moving the lever K the feed openings can be closed more or less by the ends of the regulators to determine the quantity of fertilizer passing through the feed openings.

In order to agitate the fertilizing material and to break up any lumps and to insure its pulverulent condition when passing through the feed openings, I make use of the breakers M upon the shaft D, each breaker being in the form of a blade or paddle inclined in such a manner that the direction of rotation causes the breakers to press the fertilizing material toward the feed openings and at the same time the narrow edges of the breakers cut, separate and pulverize the fertilizer so as to insure its proper condition when reaching the feed openings, and upon the shaft D and closely adjacent to the sides H' of the shell there are paddles N in the form of curved fingers, the ends of which revolve closely adjacent to the feed openings 4, and hence they agitate the fertilizer material and prevent the same clogging in or closely adjacent to the feed openings.

I prefer to cast the regulators L with upwardly extending and curved flanges bolted to the sides of the lever K so as to form an easy mode of constructing the regulating devices, and the shell H is preferably cast in two parts bolted together, and the spout is also advantageously cast in separate pieces and bolted together as shown. I however do not limit myself in these particulars.

I sometimes provide an opening at the top of the shell H with a movable cover 5 by which access can be given to the interior of the shell if necessary for cleaning or for removing obstructions.

I claim as my invention—

1. In a fertilizer distributer, the combination with a hopper and hopper base, of a shaft supported by the hopper base, a feed wheel upon the shaft and having projecting buckets upon its periphery, a shell inclosing the feed wheel and having feed openings adjacent to the channel in the hopper base and within which the feed wheel is revolved, and a spout into which the fertilizing material is discharged by the buckets of the feed wheel, substantially as set forth.

2. The combination with the hopper and hopper base, of a revolving shaft, a feed wheel upon the shaft having buckets projecting in opposite directions at its periphery, a shell inclosing the feed wheel, and a spout having a central partition for the fertilizing material to be discharged at opposite sides of the partition, substantially as set forth.

3. The combination with the hopper and hopper base, of a revolving shaft, a feed wheel upon the shaft having buckets projecting in opposite directions at its periphery, a shell inclosing the feed wheel, a spout having a central partition with a lower end that diverges in opposite directions for the fertilizing material to be discharged at opposite sides of the partition, substantially as set forth.

4. The combination in a fertilizer distributer, of a hopper and hopper base with a channel in the bottom thereof, a revolving shaft, a feed wheel carried by the shaft and having buckets projecting at its edge, a shell inclosing the feed wheel and coinciding with the channel in the hopper base, there being an opening in the shell adjacent to the hopper base for the fertilizing material to pass into the channel, and a spout into which the material is discharged by the buckets of the feed wheel, substantially as set forth.

5. The combination in a fertilizer distributer, of a hopper and hopper base with a channel in the bottom thereof, a revolving shaft, a feed wheel carried by the shaft and having buckets projecting at its edge, a shell inclosing the feed wheel and coinciding with the channel in the hopper base, there being an opening in the shell adjacent to the hopper base for the fertilizing material to pass into the channel, a spout into which the material is discharged by the buckets of the feed wheel, and a regulator for varying the size of the feed openings, substantially as set forth.

6. The combination in a fertilizer distributer, of a hopper and hopper base with a channel in the bottom thereof, a revolving shaft, a feed wheel carried by the shaft and having buckets projecting at its edge, a shell inclosing the feed wheel and coinciding with the channel in the hopper base, there being an opening in the shell adjacent to the hopper base for the fertilizing material to pass into the channel, a spout into which the material is discharged by the buckets of the feed wheel, a regulator formed of two open rings with upwardly extending flanges, and a lever for moving the regulator rings and varying the feed openings by partially or entirely covering such openings by the ends of the rings, substantially as set forth.

7. The combination in a fertilizer distributer, of a hopper and hopper base, a shaft supported by the base, a feed wheel, a shell inclosing the feed wheel and having feed openings, a spout into which the material is discharged by the feed wheel, breakers connected to and revolving with the shaft and acting to break up and disintegrate the fertilizing material in the base of the hopper and move the same toward the feed openings in the shell, substantially as set forth.

8. The combination in a fertilizer distributer, of a hopper, a hopper base having a central channel, a discharge spout with a central partition having a diverging lower end, a rotating shaft and a feed wheel upon the shaft having buckets that act within the channel of the hopper base to carry the fertilizing material up and deliver the same into the spout, a shell inclosing the feed wheel and having feed openings adjacent to the inner surface of the hopper bottom, a regulator for varying the size of the feed openings, breakers upon the shaft for agitating and separating the fertilizing material, and paddles with their ends revolving near the feed openings for agitating the material, substantially as set forth.

Signed by me this 4th day of June, 1894.

L. AUG'S. ASPINWALL.

Witnesses:
 WALTER ALEXANDER,
 C. G. ROWLEY.